United States Patent
Feuerstein (10) Patent No.: US 12,144,319 B1
(45) Date of Patent: Nov. 19, 2024

(54) SOUNDPROOF DOG KENNEL

(71) Applicant: Stefan J. Feuerstein, El Paso, TX (US)

(72) Inventor: Stefan J. Feuerstein, El Paso, TX (US)

( * ) Notice: Subject to any disclaimer, the term of this patent is extended or adjusted under 35 U.S.C. 154(b) by 0 days.

(21) Appl. No.: 18/478,662

(22) Filed: Sep. 29, 2023

(51) Int. Cl.
    *A01K 1/03* (2006.01)

(52) U.S. Cl.
    CPC .................... *A01K 1/034* (2013.01)

(58) Field of Classification Search
    USPC ....... 119/482, 416, 452, 453, 454, 496, 498, 119/500, 493
    See application file for complete search history.

(56) References Cited

U.S. PATENT DOCUMENTS

| | | | |
|---|---|---|---|
| 7,997,234 B1* | 8/2011 | Hughey | A01K 1/0245 119/500 |
| 8,276,544 B2 | 10/2012 | Seltzer | |
| 8,387,747 B2* | 3/2013 | Koike | B32B 15/12 181/290 |
| 8,544,418 B2* | 10/2013 | Jiang | A01K 1/0356 119/493 |
| 8,915,216 B2* | 12/2014 | Hoegh | A01K 1/0017 119/721 |
| 8,944,010 B2* | 2/2015 | Willard | A01K 1/033 119/498 |
| 9,044,101 B2* | 6/2015 | Garcia | A47C 29/003 |
| 9,906,897 B2* | 2/2018 | Milne | H04W 4/80 |
| 10,098,318 B2* | 10/2018 | Romney | G06Q 30/0645 |
| 10,208,975 B2* | 2/2019 | Azevedo | H05B 47/115 |
| 10,791,701 B2 | 10/2020 | Zemet | |
| 11,337,404 B2* | 5/2022 | Seta | A01K 1/0236 |
| 2005/0284405 A1* | 12/2005 | Pomakoy-Poole | A01K 1/0245 119/497 |
| 2010/0319627 A1* | 12/2010 | Cauchy | G05D 23/1917 119/500 |
| 2011/0005466 A1* | 1/2011 | Furth | H04N 7/185 119/496 |

FOREIGN PATENT DOCUMENTS

WO    WO 01/33001    *    5/2001    ............... E04B 1/82

OTHER PUBLICATIONS

Notnowvicar post, Soundproofing Wall, Discussion in 'Builders Talk' started by cycloneuk, May 22, 2022 [retrieved from internet Nov. 6, 2023] https://community.screwfix.com/threads/soundproofing-wall.252917/] 4 pages.*

* cited by examiner

*Primary Examiner* — Andrea M Valenti
(74) *Attorney, Agent, or Firm* — Sanchelima & Associates, P.A.; Jesus Sanchelima; Christian Sanchelima (57) ABSTRACT

A soundproof dog kennel includes a box-shaped housing with noise-dampening walls and an opening for dog ingress/egress. One or more walls has a baffle configuration with hollow corridors, an air intake end, and an exhaust end. A fan at the intake end forces air through the corridors to dampen ambient noise. An extractor removes stale air. Speakers may play predetermined sounds such as white noise, music, or sound transmitted from the surroundings (after going through a filtering process) inside. Oxygen and other levels are monitored. A light source and electric door latch are included. The kennel protects dogs from noise pollution like fireworks, engines, and airplane auxiliary power units that cause distress. Baffles disrupt sound waves to insulate the interior. The kennel provides a safe, quiet space for dogs.

1 Claim, 6 Drawing Sheets

SOUNDPROOF DOG KENNEL

BACKGROUND OF THE INVENTION

1. Field of the Invention

The present invention relates to a dog kennel and, more particularly, to a dog kennel that includes noise-dampening features.

2. Description of the Related Art

Several designs for dog and pet enclosures that include soundproofing material have been designed in the past. However, the state of art fail to address the noise-dampening or noise-cancelling dog kennel including a baffle box.

Applicant believes that a related reference corresponds to U.S. Pat. No. 8,276,544 which discloses a sound dampened pet abode. The cited disclosure comprises a pet abode with sound dampening characteristics comprising an interior space of a pet abode having sufficient dimensions to allow a pet to comfortably reside within the interior space. The interior space is formed from at least three walls, where one or more of the walls exhibits sound damping characteristics. The sound damping characteristics are from one or more sounds originating from a source external to the interior space. That is, the interior space of the pet abode is soundproofed, allowing a pet to be undisturbed by loud noises outside the interior space.

Applicant believes that another related reference corresponds to U.S. Pat. No. 10,791,701 which discloses a collapsible sound reducing pet container. The cited disclosure comprises a collapsible sound reducing pet container when fully assembled forms an enclosure having a generally rectangular volume with manually disassemblable top, bottom, front, rear, left and right panels. The front panel defines a cutout having an area less than that of the front panel, and at least one of the panels comprises multiple layers of dissimilar soundproofing material. An electric fan mounted to one of the panels, becomes energized in response to presence of an animal within the enclosure. Each of the top, front, rear, left, and right panels is sized to allow all of the panels to be stacked between and enclosed within the top and bottom panels, to collapse the container for transport and storage.

Other documents describing the closest subject matter provide for a number of more or less complicated features that fail to solve the problem in an efficient and economical way. The cited references fail to address a noise-dampening or noise-cancelling dog kennel comprising a box-shaped housing consisting of a series of walls and an opening to permit egress and ingress of a dog, wherein one or more of the walls has a baffle configuration comprising at least one hollow corridor, an air intake end, and an exhaust end wherein a fan is located at the air intake end and is operable to force air through the at least one hollow corridor, thereby dampening and/or cancelling ambient noise.

SUMMARY OF THE INVENTION

One of the objectives of the present invention is to provide a dog kennel designed to protect animals from loud noises, particularly fireworks, airplane engines, airplanes auxiliary power unit systems (APU), generators, and other sources of noise pollution that can potentially cause distress or harm to animals.

It is another object of this invention to provide a dog kennel having passages disposed on one or more of its walls that allow air to flow through while simultaneously dissipating noise.

It is still another object of the present invention to provide safe place to keep dogs that reduces sound that pets are exposed to and thus reduces anxiety.

It is yet another object of this invention to provide such a device that is inexpensive to implement and maintain while retaining its effectiveness.

Further objects of the invention will be brought out in the following part of the specification, wherein detailed description is for the purpose of fully disclosing the invention without placing limitations thereon.

BRIEF DESCRIPTION OF THE DRAWINGS

With the above and other related objects in view, the invention consists in the details of construction and combination of parts as will be more fully understood from the following description, when read in conjunction with the accompanying drawings in which.

DETAILED DESCRIPTION OF THE EMBODIMENTS OF THE INVENTION

Referring now to the drawings, where the main embodiment of the present invention is generally referred to with numeral 10, it can be observed that it basically includes a kennel assembly 20, at least one baffle box assembly 40 and an electronic assembly 60. An alternative embodiment of the present invention is referred to with numeral 100. It should be understood there are modifications and variations of the invention that are too numerous to be listed but that all fit within the scope of the invention. Also, singular words should be read as plural and vice versa and masculine as feminine and vice versa, where appropriate, and alternative embodiments do not necessarily imply that the two are mutually exclusive.

Figure 1:
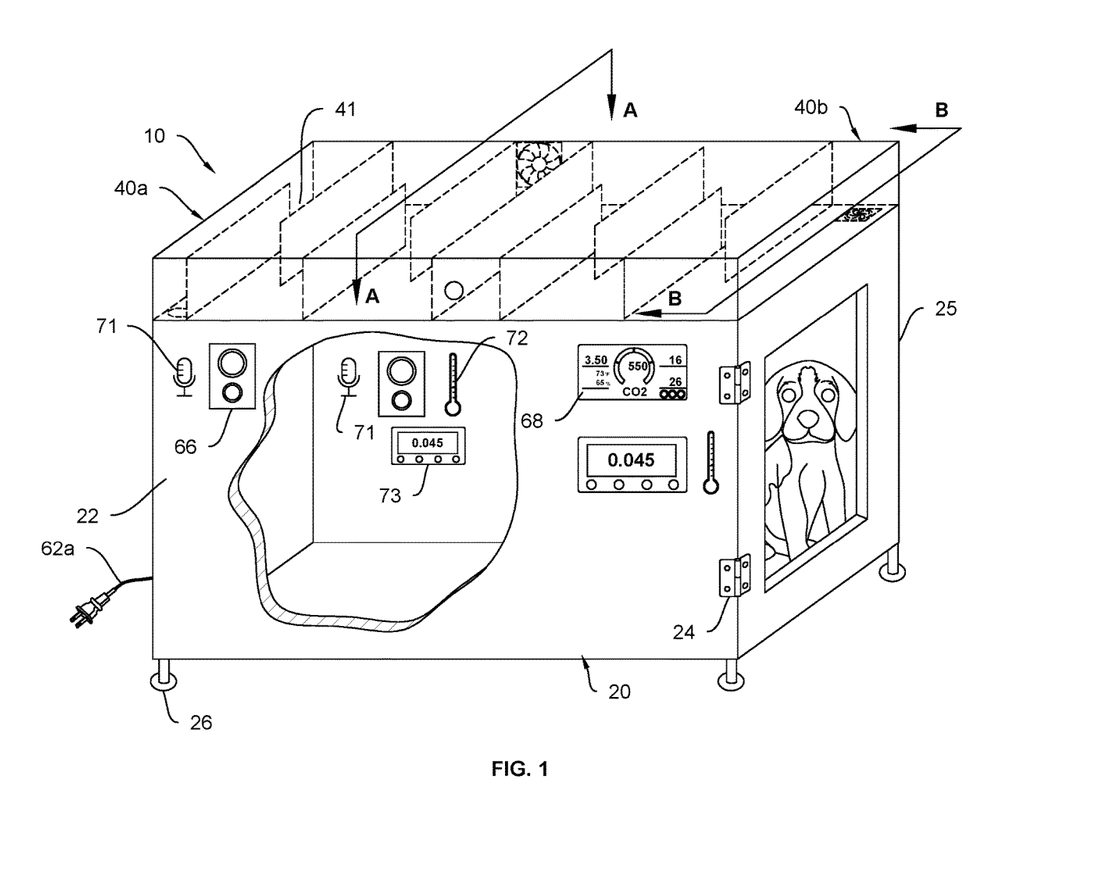
FIG. 1 represents a partially broken operational view of the present invention.
Figure 2:
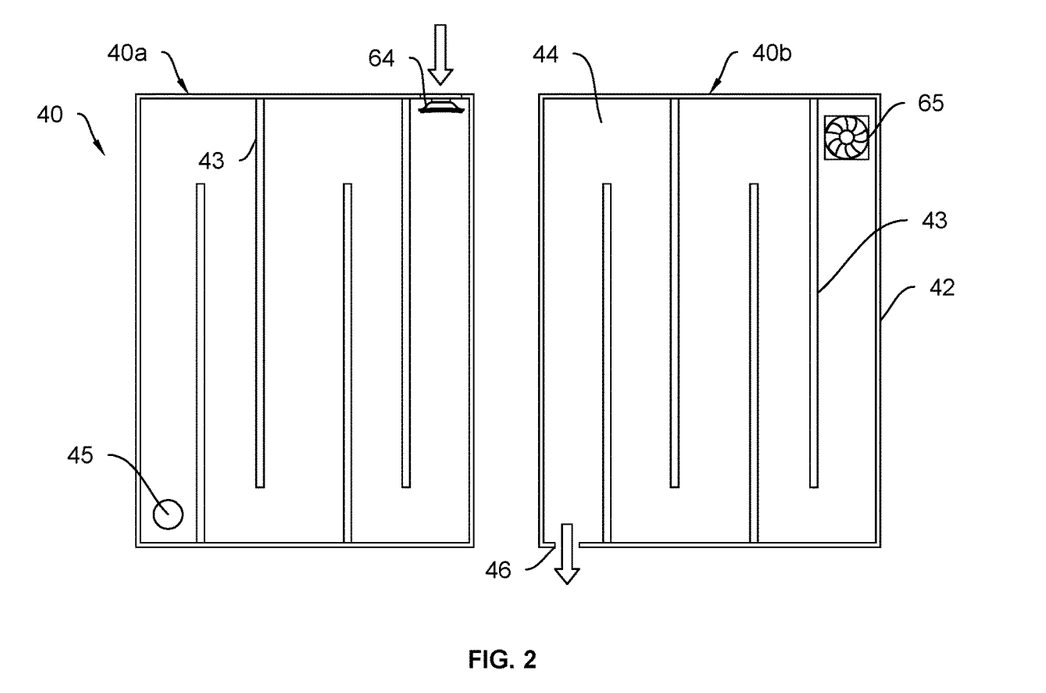
FIG. 2 shows a cross sectional top view of the baffle box assembly 40 from lines B-B in one exemplary embodiment thereof.
Figure 3:
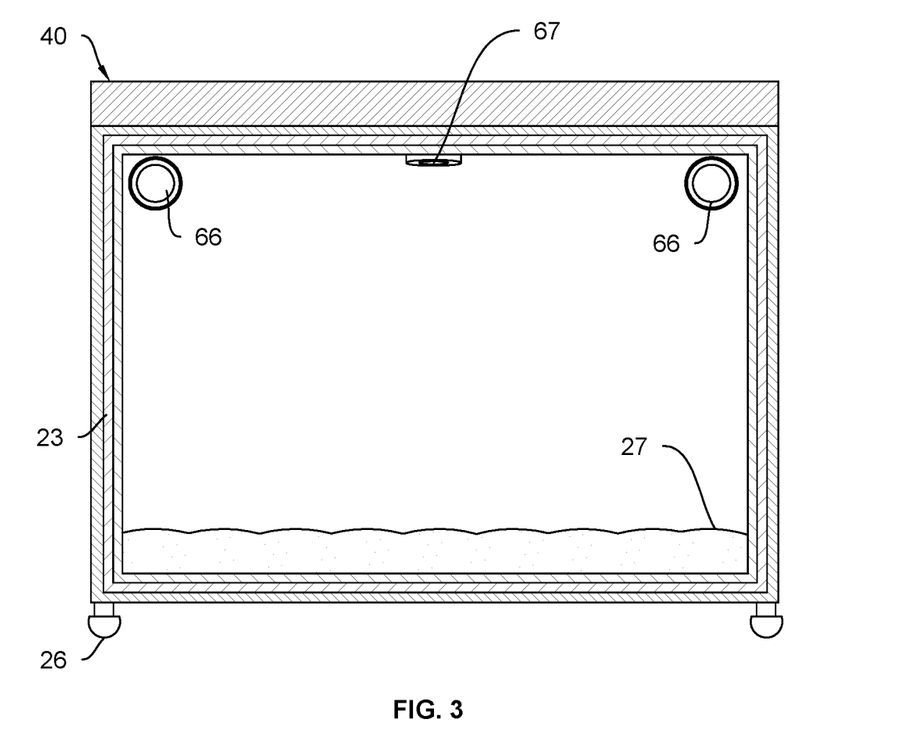
FIG. 3 illustrates a cross sectional view of the of the present invention from lines A-A

As illustrated in FIG. 1-3 the present invention 10 includes kennel assembly 20 (also termed as kennel 20). The kennel assembly 20 may be a structure designed primarily to provide shelter, confinement (stationary or during transportation, depending on operational conditions), and security for dogs. Furthermore, the kennel 20 can be pre-assembled or assembled by the user. In various embodiments, the kennel assembly 20 may consist of four walls, a base, and a roof, forming an enclosed space that serves as a containment area for dogs. Kennels, as known in the prior art, are commonly constructed using materials such as wood, metal, or chain link fencing, with dimensions that vary based on the intended use and the number or size of dogs it is meant to accommodate. The shape of the kennel assembly can be rectangular or square, with variations in size and design to suit different needs. It should be understood that the kennel assembly 20 as shown in the figures, is presented for illustrative purposes and not in a limiting sense. Thus, the general structure thereof may vary without departing from the scope of the appended claims. In an exemplary embodiment, the kennel assembly may include walls 22 composed of layers 23, hinges 24 connected to one of the walls 22 and to a door 25, legs 26 and inner cushioning 27. It should be understood that the aforementioned components may serve as the foundation for the present invention and are not meant to be limiting in any way. Additional components may be added based on operational conditions. The walls 22 may enclose and define the space, providing containment and separation for dogs within the designated area. Depending on the general geometry of the present invention 10, the kennel may be composed of four, or more, lateral walls 22, a roof and a base. For explanatory purposes, the kennel herein disclosed may include four lateral walls 22. Wherein said walls 22 may form a cuboid structure. In different embodiments, each of the walls 22 may have a quadrangular, a rectangular, a regular and/or an irregular shape. Each of the walls 22 may be constructed with suitable materials as known in the prior art for noise cancelation, which may be engineered to minimize the propagation of sound waves, thereby creating a space that may be less affected by external noise disturbances. The walls 22 may be constructed with multiple layers 23 of different materials to mitigate and cancel noise, as shown in FIG. 3 for illustrative purposes. Such layered materials may serve to absorb, deflect, or dampen sound waves. In one embodiment, acoustic insulation materials such as fiberglass or foam panels, which absorb sound energy, may be used for the layers 23. Additionally, thick and dense materials like mass-loaded vinyl may help to block sound from passing through. The arrangement of suitable materials, such as the ones listed, in layers 23 may create a barrier that disrupts the path of sound waves. Legs 26 may be disposed at the corners of the base of the kennel, or in other suitable arrangement. The legs 26 may be constructed, in full or in part, of acoustic insulation materials to prevent sound transmission, or placed on sound dampening coasters. When sound travels through the floor, it can disrupt the kennel's primary purpose of noise reduction. By using acoustic insulation materials for the legs 26, a sound-resistant barrier is established, effectively insulating the kennel from the floor. This separation ensures that sound vibrations are not easily transmitted through the legs. Materials commonly found in drum set legs, for instance, can also be utilized in the kennel legs 26 to further hinder the transmission of sound. The door 25 may be removably attached to a wall by means of hinges 24. In a suitable embodiment, the hinges 24 may be demountable, allowing a user to easily remove and attach the door 25 from the kennel 20. It must be understood that any other suitable fastening means may be used to replace the hinges 24. Additionally, the door 25 may be created with sound canceling materials as the ones used to manufacture the walls 22. In various embodiments, the door 25 may include additional features, such as a transparent portion that may allow the user to visually monitor the state of the dog inside the kennel 20. In another exemplary embodiment, the door 25 may be a sliding door. In an alternate embodiment, even when the door 25 is removed, the kennel 20 can still function as a shelter, sleeping area, or bed for dogs or other animals, though its soundproofing capability is diminished. The door 25 may include an electric door latch 69. The electric door latch 69, can be automatically activated when sensors within the electronic assembly 60 detect specific conditions that could pose a danger to the animal. For example, this activation occurs in response to detecting elevated levels of carbon dioxide, insufficient oxygen, or temperatures exceeding or falling below predefined thresholds.

Figure 5:
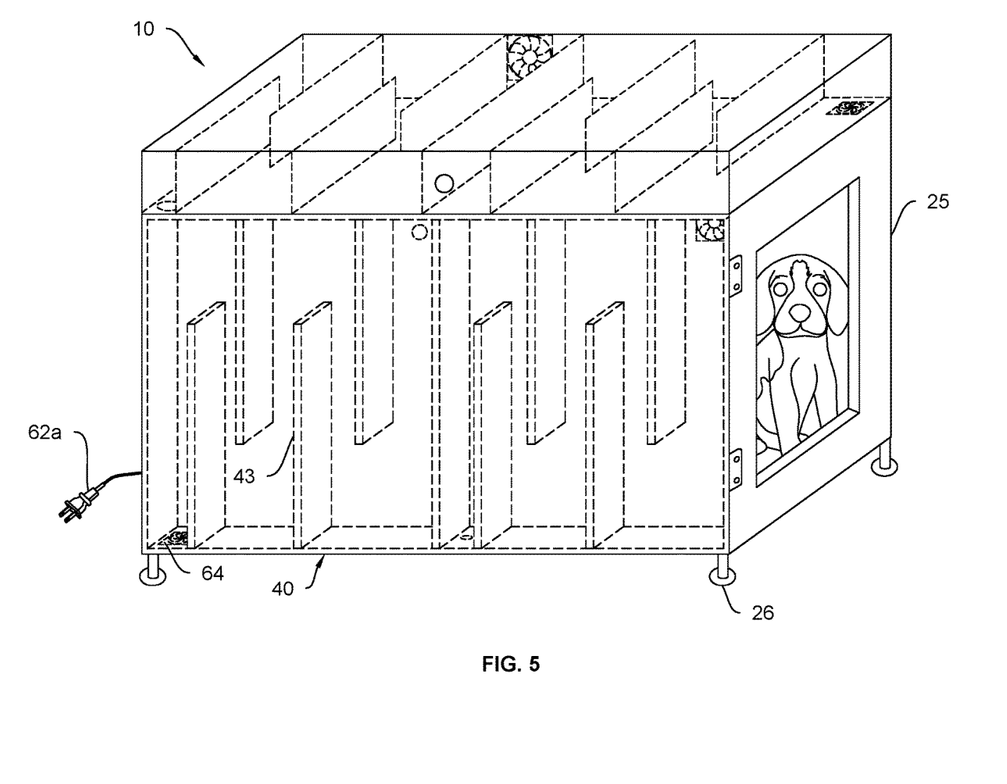
FIG. 5 depicts an isometric view of the present invention in an alternate embodiment.

As appreciated in FIG. 1-2 the baffle box assembly 40 formed by an inlet section 40a and an exhaust section 40b. Each section may include a housing 42, baffles 43, a base 44. The inlet portion 40a may include an air intake 45 and may work in concert with a fan 64 from the electronic assembly 60. The exhaust section 40b, on the other hand, may include a vent 46 (also termed as exhaust end) and may work together with an extractor 65 from the electronic assembly 60. A baffle, as widely known, may be a structural or acoustic component designed to alter the direction, flow, or properties of a fluid or sound. In the context of acoustic baffles, they are typically used to control or modify the propagation of sound waves. The baffle box assembly 40 may be constructed of acoustic insulation materials to prevent sound transmission. In a suitable embodiment, the baffle box assembly 40 may be disposed on the kennel's roof as depicted in FIG. 1. Nonetheless, in other embodiments, the baffle box assembly 40 may be embedded in any of the walls 22 that comprises the kennel 20. See for instance FIG. 5, in which multiple inlet sections and exhaust sections are disposed in varying locations. Furthermore, in FIG. 1 the inlet section 40a is adjacent to the exhaust section 40b, however, such a configuration is shown for illustrative purposes, as both the inlet section and the exhaust sections (40a, 40b) may be embedded in different walls 22 or portions of the kennel 20. The housing 42 may refer to the lateral enclosure that surrounds the baffles 43 of each section, whereas the base 44 may be the surface that support the baffles 43. The baffles 43 may be positioned to disrupt the path of sound waves. The baffles 43 may be arranged in a manner that creates a labyrinth-like structure creating channels or passages through which air must navigate. As sound waves navigate through the channels created by the baffles 43, they are damped, causing the sound wave amplitude to diminish by the time they reach the final end of the channel. The baffles 43 within each of the inlet section 40a and the exhaust section 40b may form at least one hollow corridor 41. In the kennel's exhaust section (40b), the extractor 65 may remove air from the kennel's interior. The air follows a path through the baffles 43 until it ultimately reaches the vent 46. Concurrently, within the air injection side (inlet section 40a), the fan 64 may be strategically mounted on the housing 42 to introduce fresh air into the channels. In general, air vents, fan 64 and extractor 65 may be placed to allow maximum airflow and the least obstruction depending on the location where the kennel may be placed. This synchronized process is essential, allowing for the circulation of air through the kennel 20. It ensures the removal of stale air and the continuous supply of noise-free, clean air into the kennel through the air intake 45. The harmonious operation of the inlet and exhaust sections (40a, 40b) is pivotal in maintaining a comfortable environment for the animals inside.

Figure 4:
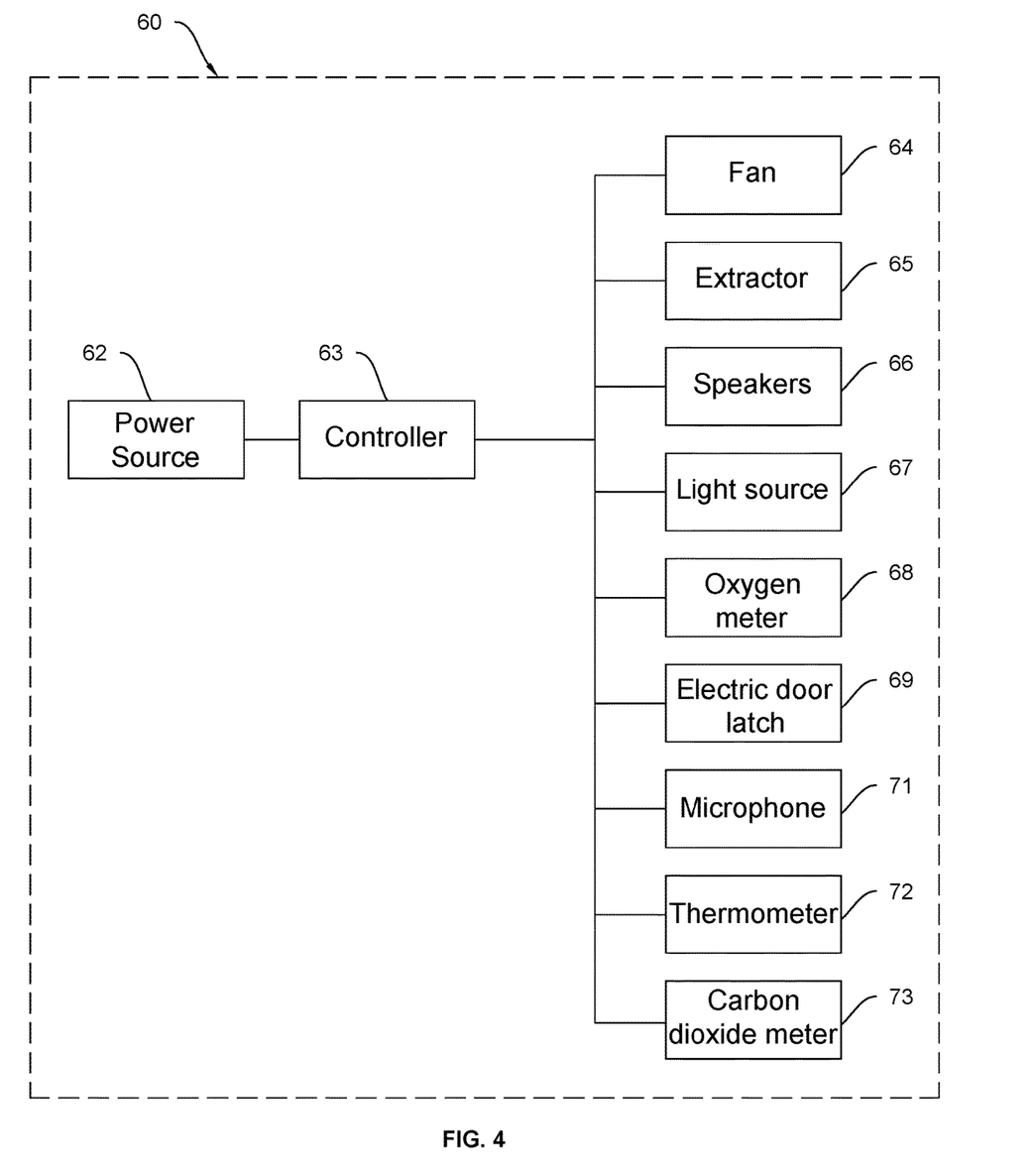
FIG. 4 is a representation of a schematic diagram of the present invention according to an exemplary embodiment.

The electronic assembly 60 may include a power source 62, a controller 63, the fan 64, the extractor 65, speakers 66, a light source 67, gas sensors (such as an oxygen meter 68 and a carbon dioxide meter 73), the electric door latch 69, a microphone 71, and a thermometer 72. As depicted in the schematic diagram of FIG. 4, the power source 62 may be electrically connected to the rest of the components to provide power supply to them. The power source 62 may be, for instance, a battery or the like. Alternatively, the present invention may include a power cord 62a that can be plugged into a standard electrical outlet or power source. Said controller 63 may govern the operation of the remaining components; wherein the controller 63 may be a built-in control panel or remote control systems that may enable the user to adjust and manage the electronic components. The controller 63 may include setting the desired temperature, adjusting lighting levels, configuring ventilation settings, or the like. The electronic assembly 60 may be mounted inside and/or outside the kennel assembly 20 and/or to the baffle box assembly 40. In a suitable embodiment, the extractor 65 may remove stale air, odors, and potentially harmful substances from the kennel environment. It may maintain good air quality, regulate temperature and humidity. The light source 67 may be disposed within the kennel 20. Additionally, the speakers 66 may be internally (facing the interior of the kennel 20) and/or externally mounted on the walls 22 to reproduce predetermined sounds such as white noise, music, or the like, that may help reducing noise perception coming from the environment. The user, by means of the controller 63, may select the sound to be reproduced. The speakers 60 may also enable the animal inside the kennel to hear surrounding sounds by capturing external sounds and transmitting them to the interior speakers. This configuration is achieved through the combination of microphone 71 characteristics, controller 63 functions, and speakers 66 operations: microphones 71 acquire sound waves and convert them into an electrical signal, which is received by controller 63. The controller 63 may possess filtering capabilities to eliminate frequencies outside a predetermined range, such as frequencies emitted by fireworks. The filtered signal is then transmitted for reproduction by the speakers 66. In another embodiment, the microphone 71 may be disposed within the kennel and the speakers 66 on the outside to enable individuals near the kennel to listen to the animal inside and to hear any distress, barking, or other sounds occurring within. The oxygen meter 68 may measure oxygen levels inside the kennel when the door is closed, when levels below a predetermined threshold are detected, the oxygen meter 68 may send a signal to the controller 63 for the latter to actuate the electric door latch 69, thereby unlocking the door 25. Same principle may be applied to what may be sensed by the thermometer 71 and carbon dioxide meter 73.

Figure 6:
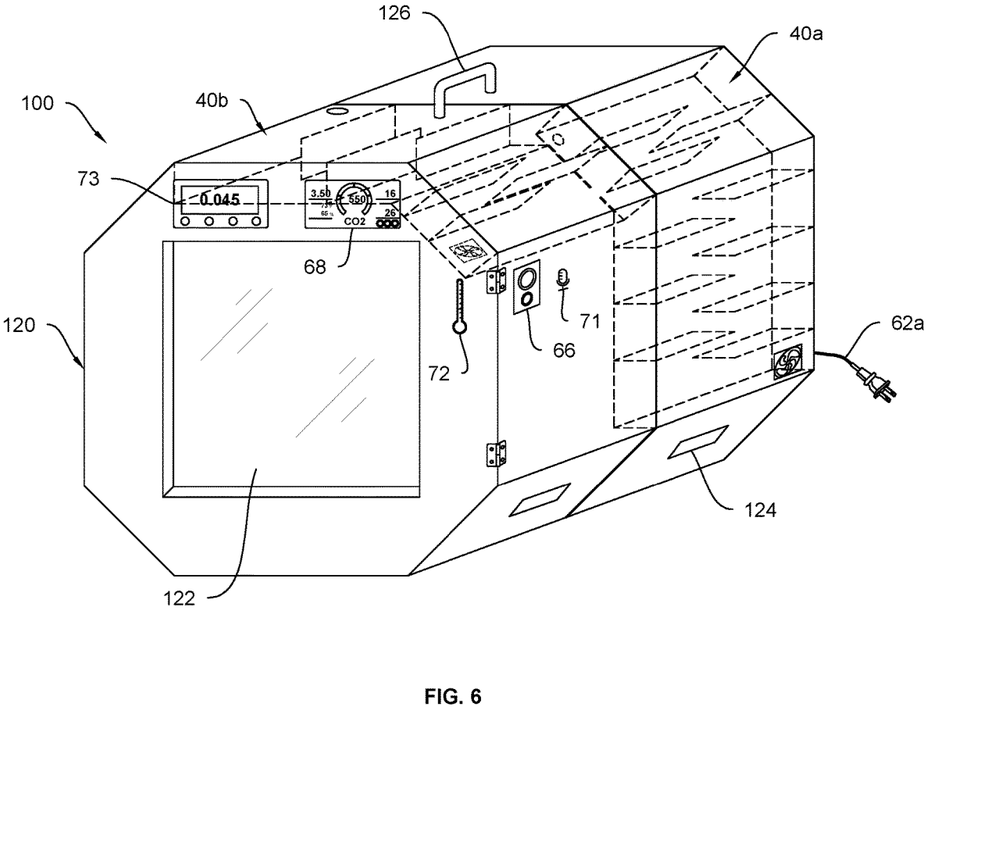
FIG. 6 showcases an isometric view of the illustrative embodiment 100 of the present invention.

FIG. 6 showcases an alternative embodiment 100 of the present invention. In the present embodiment, the kennel 120 may include a window 122 on the door, carrying means such as holes 124 for the transportation with forklifts and/or handles 126. The kennel 120 in the present embodiment may be used as an airplane transportation pod for dogs and/or other pets. In airplanes, pets are kept in the cargo hold near equipment like generators and the Auxiliary Power Unit (APU) that generate significant noise. Pets are also kept together, exposed to barking that causes more stress. This adds to noise from airplane engines, which can be scary for animals like dogs. In the present embodiment, the kennel 120 may conform with airplane freight size and shape requirements. Both the inlet section 40a and the exhaust section 40b of the baffle box assembly 40, as described above, may be incorporated into the current embodiment as depicted in FIG. 6. The elements of the electronic assembly 60 may also be used to inject and extract air from the interior of the kennel 120 and for monitoring the state of the animal inside the kennel 120. Therefore, it should be understood that the alternative embodiment 100 may also include the power source 62, the controller 63, the fan 64, the extractor 65, speakers 66, the light source 67, gas sensors (such as the oxygen meter 68 and the carbon dioxide meter 73), the electric door latch 69, the microphone 71, and the thermometer 72. In the present embodiment, it can be appreciated that the exhaust section 40b may be disposed within a top portion of the kennel 120, whereas the inlet portion 40a may be disposed within a lateral wall thereof. Such a configuration is intended to demonstrate how the portions (40a, 40b) may be disposed in separate walls within the kennel 120 and still achieved their main functionality, that is: allowing for the circulation of air through the kennel 120 while reducing environmental noise. In different embodiments, the window 122 may be double/triple glazed. The holes 124 may be forklifting holes, also known as forklift pockets or forklift slots, which are openings or channels designed into the bottom portion of the kennel 120 to facilitate lifting and transportation using a forklift. These holes 124 or slots are strategically positioned to allow the forklift's forks to be inserted, providing a secure grip for lifting and moving the object. The kennel 120 may include one or multiple handles 126 which may provide a convenient and secure grip for lifting, carrying and maneuvering the kennel 120.

The foregoing description conveys the best understanding of the objectives and advantages of the present invention. Different embodiments may be made of the inventive concept of this invention. It is to be understood that all matter disclosed herein is to be interpreted merely as illustrative, and not in a limiting sense.

What is claimed is:

1. A noise-dampening dog kennel, consisting of:
a) a box-shaped housing having a plurality of walls, wherein the plurality of walls comprise layers of noise dampening acoustic insulated materials, a door mounted to the box-shaped housing by hinges, wherein said box-shaped housing includes forklifting holes or handles for carrying and legs; wherein said forklifting holes are channels located into a bottom portion of the box-shaped kennel, wherein said door has a height equal to a height of each of said plurality of walls, wherein said door has a transparent portion on a central portion therein, wherein said hinges are demountable;
b) an electronic assembly including a power source, a controller, a fan, an extractor, one or more speakers and microphones, wherein said one or more speakers include a first speaker placed on an outer surface of said box-shaped housing and a second speaker attached to a inner surface of said box-shaped housing, wherein said microphones include a first microphone attached to said outer surface of said box-shaped housing and a second microphone attached to said inner surface of said box-shaped housing, wherein said first speaker is configured to transmit sounds from inside of said box-shaped housing recorded by said second microphone, wherein said second speaker is configured to transmit sounds from outside of said box-shaped housing recorded by said first microphone, said electronic assembly further includes a light source mounted within the box-shaped housing, an oxygen meter, a carbon dioxide meter, a thermometer, and an electric door latch, wherein the controller activates the electric door latch in response to gas, temperature, or oxygen levels exceeding or falling below predefined thresholds, wherein said controller includes settings for adjusting lighting level of said light source, configuring ventilation settings, and filtering predetermined sounds obtained by said first microphone from outside of said box-shaped housing, wherein said first speaker is configured to produce white noise and music, said controller is configured to selectively actuate said one or more speaker and said microphones; and c) a baffle box assembly embedded within at least one wall of the plurality of walls, wherein said baffle box assembly includes a housing enclosing baffles and a base to support said baffles, said baffles forming hollow corridors, thereby defining an inlet portion and an outlet portion, wherein:

the inlet portion having the fan mounted at a distal end of a first hollow corridor, said fan is configured to introduce air inside the corridor formed by the baffles, the inlet portion having an air intake located at a distal end opposite to said fan, wherein said air intakes connects said first hollow corridor with an interior of said kennel; and the outlet portion having the extractor mounted at a distal end of a second hollow corridor, said extractor is configured to extract air from the interior of the kennel, said outlet portion having a vent at a distal end opposite to said extractor.

\* \* \* \* \*